(12) United States Patent
Dommaschk et al.

(10) Patent No.: US 9,647,529 B2
(45) Date of Patent: May 9, 2017

(54) MODULAR MULTI-STAGE INVERTER COMPRISING SURGE ARRESTER

(71) Applicant: SIEMENS AKTIENGESELLSCHAFT, Munich (DE)

(72) Inventors: Mike Dommaschk, Moehrendorf (DE); Guenter Ebner, Henfenfeld (DE); Klaus Wuerflinger, Nuremberg (DE)

(73) Assignee: Siemens Aktiengesellschaft, Munich ( * ) Notice: Subject to any disclaimer, the term of this patent is extended or adjusted under 35 U.S.C. 154(b) by 0 days.

(21) Appl. No.: 14/763,247

(22) PCT Filed: Jan. 24, 2013

(86) PCT No.: PCT/EP2013/051349
§ 371 (c)(1),
(2) Date: Jul. 24, 2015

(87) PCT Pub. No.: WO2014/114339
PCT Pub. Date: Jul. 31, 2014

(65) Prior Publication Data
US 2015/0364986 A1 Dec. 17, 2015

(51) Int. Cl.
*H02M 1/32* (2007.01)
*H02M 7/44* (2006.01)
(Continued)

(52) U.S. Cl.
CPC .............. *H02M 1/32* (2013.01); *H02M 7/44* (2013.01); *H02M 7/49* (2013.01); *H02M 7/217* (2013.01)

(58) Field of Classification Search
CPC .......... H02M 1/32; H02M 7/217; H02M 7/44; H02M 7/49; H02M 2007/4835;
(Continued)

(56) References Cited

U.S. PATENT DOCUMENTS 4,695,919 A * 9/1987 Wendt ...................... H04B 3/36
340/425.1
5,666,277 A * 9/1997 Bjorklund ................. H02J 3/36
323/208
(Continued)

FOREIGN PATENT DOCUMENTS

DE 102006036092 A1 2/2008
WO 0223705 A1 3/2002
(Continued)

*Primary Examiner* — Jessica Han
*Assistant Examiner* — Demetries A Gibson
(74) *Attorney, Agent, or Firm* — Laurence Greenberg; Werner Stemer; Ralph Locher

(57) ABSTRACT

Electric power is transferred between an AC voltage grid and a DC voltage grid in the high-voltage range. Phase modules have at least one common DC voltage connection and separate AC voltage connections. A phase module branch between the DC voltage connection and each AC voltage connection has a series circuit of two-pole sub-modules, each with an energy storage device and a power semiconductor circuit in parallel with the energy storage device. The power semiconductor circuit is driven to generate either the voltage drop across the energy storage device or else a zero voltage at the two sub-module connection terminals. A converter transformer has a primary side on an AC voltage grid and a secondary side connected to the AC voltage connections. Improved protection against overloading is provided by at least one surge arrester between the or one of the common DC voltage connections and the inverter neutral point.

4 Claims, 1 Drawing Sheet

(51) Int. Cl.
*H02M 7/49* (2007.01)
*H02M 7/217* (2006.01)

(58) Field of Classification Search
CPC .... H02M 7/797; H02M 5/458; H02H 7/1257; H02J 3/36; H02J 3/34; Y02E 60/60
See application file for complete search history.

(56) References Cited

U.S. PATENT DOCUMENTS

| | | |
|---|---|---|
| 8,233,300 B2 | 7/2012 | Dommaschk et al. |
| 8,837,093 B2 * | 9/2014 | Panousis .............. H01H 33/596 361/13 |
| 8,861,231 B2 | 10/2014 | Cross et al. |
| 8,878,396 B2 * | 11/2014 | Faxvog .................. H02H 3/52 307/126 |
| 2012/0218672 A1 * | 8/2012 | Nunes ..................... H02M 1/32 361/91.1 |
| 2013/0314466 A1 * | 11/2013 | Ito ....................... B41J 2/04566 347/17 |

FOREIGN PATENT DOCUMENTS

| | | |
|---|---|---|
| WO | 2008067785 A1 | 6/2008 |
| WO | 2011098117 A1 | 8/2011 |

\* cited by examiner

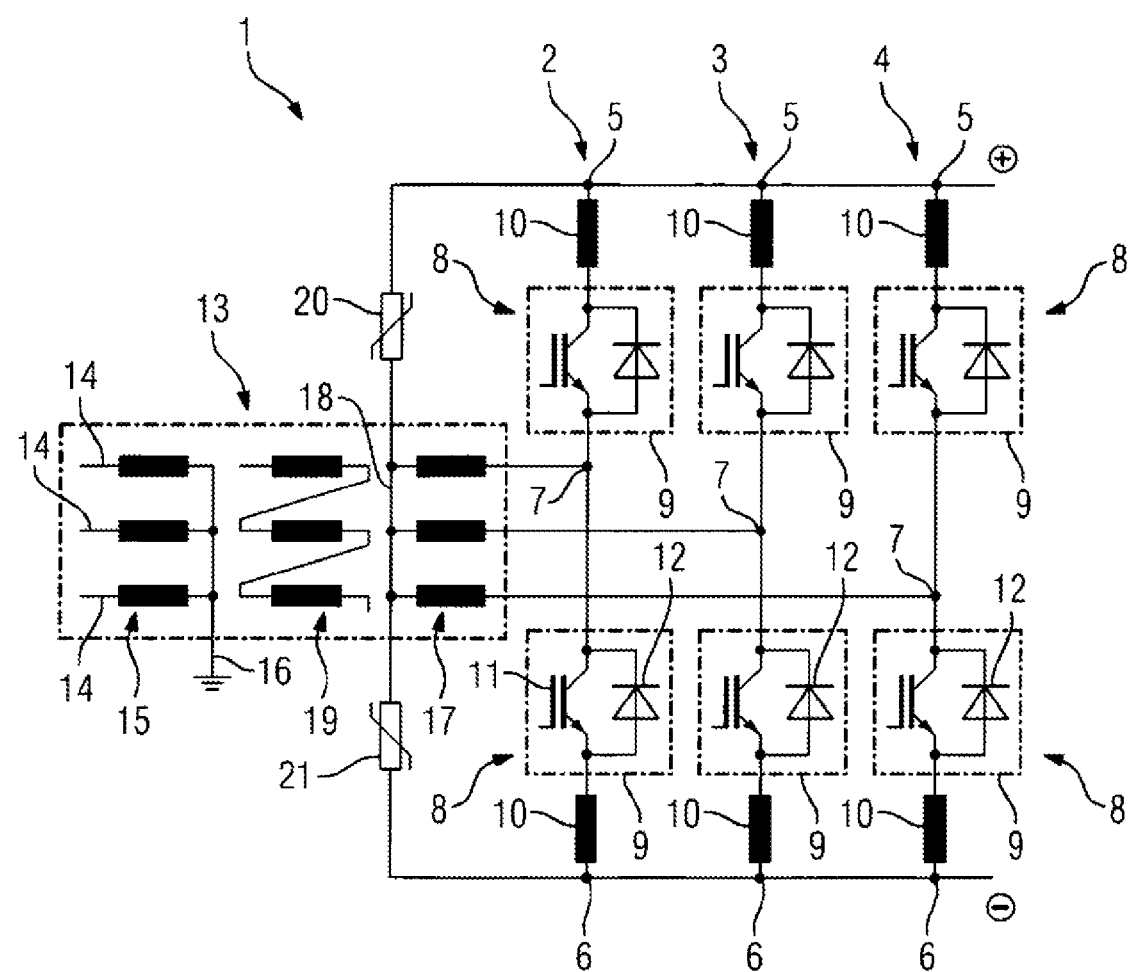

MODULAR MULTI-STAGE INVERTER COMPRISING SURGE ARRESTER

BACKGROUND OF THE INVENTION

Field of the Invention

The present invention relates to a device for transferring electrical power between an AC voltage network and a DC voltage network in the high-voltage range, including phase modules, each having at least one shared DC voltage terminal and a separate AC voltage terminal, wherein one phase module branch extends between each DC voltage terminal and each AC voltage terminal, which includes a series circuit made up of two-pole submodules, each having an energy storage device and a power semiconductor circuit connected in parallel with the energy storage device, so that, depending on the control of the power semiconductor circuit at the two submodule connection terminals, either the voltage dropping across the energy storage device or a zero voltage is able to be generated; and including a converter transformer forming a neutral point on the secondary side, which is connectable or is connected to an AC voltage network on the primary side and to each AC voltage terminal on the secondary side. The neutral point of the secondary winding connected to the converter is referred to below as the converter neutral point.

Such a device is already known from the established practice under the term "modular multi-stage converter." Modular multi-stage converters are, for example, used in the field of high-voltage DC current transmission. Because of its modular topology, the converter is easily scalable and may be easily adapted to the particular requirements. The voltage at the AC voltage terminals of the modular multi-stage converter may be increased in stages, in which the level of the stages corresponds to the voltage dropping across each energy storage device. The power semiconductor circuit has power semiconductor switches which are able to be switched on and off, in which so called IGBTs in particular are used. Commercially available IGBTs currently have a blocking capacity of between 1.7 kV and 6.5 kV; thus, hundreds of submodules are connected in series in the high-voltage range. It is therefore possible to generate a virtually harmonic voltage profile at the AC voltage terminal without a requiring a great deal of filtering. To protect the power semiconductor switches of the submodules, bypass switches are provided which are situated between the submodule connection terminals and via which a bridging of each associated module is made possible. In the event of overloading of the entire converter, the danger exists that all bypass switches will be inadvertently fired. However, this may result in disadvantages.

BRIEF SUMMARY OF THE INVENTION

The object of the present invention is therefore to provide a device of the kind initially specified, in which improved protection from overloading is provided.

The present invention achieves this object in that at least one surge arrester is provided which extends between the or one of the shared DC voltage terminals and the converter neutral point of the converter transformer.

According to the present invention, it is provided to arrange surge arresters between the DC voltage terminals and the converter-side transformer neutral point. Within the scope of the present invention, the surge arrester does not necessarily have to be directly connected to the DC voltage terminal. It may also extend between the converter neutral point and a potential point which lies between the power electronics component of each phase module branch and an inductor, for example, a DC voltage choke. Within the scope of the present invention, it is essential that the potential dropping across the surge arrester is comparable to the potential between the converter neutral point and the DC voltage terminal in question and that it is co-determined by this potential. This enables the use of surge arresters for protecting an initially specified modular multi-stage converter. Surge arresters generally have a characteristic curve from which a ratio between the avalanche voltage and the operating voltage of approximately 1.6 to 2.0 results. If such a surge arrester were to be connected in parallel with a phase module branch, i.e., arranged between the DC voltage terminal and the AC voltage terminal, it would be able to provide no protection. In the currently known submodules, the triggering voltage of the bypass switch of each submodule is approximately 1.5 per-units of the maximum operating voltage. Effective protection would therefore not be possible with a surge arrester. The present invention is based on the discovery that the voltage dropping across a phase module branch is of the order of magnitude of the DC voltage which drops across the entire device on the DC voltage side. In contrast, the difference in potential between the shared DC voltage terminal and the converter neutral point is only approximately half of the DC voltage which drops across the entire device on the DC voltage side. Therefore, if the surge arrester is connected between the converter neutral point of the converter transformer and the shared DC voltage terminal, effective protection of the phase module branches is achieved by the present invention. Within the scope of the present invention, it is under no circumstances required for the voltage to be split symmetrically between the DC voltage terminals with respect to the ground potential, i.e., for example, at +300 kV and −300 kV. Within the scope of the present invention, one of the DC voltage terminals may, for example, be at a potential near the ground potential or a medium-voltage potential, while the other DC voltage terminal is, for example, at +600 kV.

Within the scope of the present invention, the power semiconductor circuit has power semiconductor switches which are able to be switched on as well as switched off. Such power semiconductor switches are, for example, IGBTs, GTOs, IGCTs or the like. A flyback diode is inversely connected in parallel with each of these power semiconductor switches which are able be switched on and off. However, alternatively, reverse-conducting power semiconductor switches may also be used.

Within the scope of the present invention, the design of the power semiconductor circuit is generally arbitrary.

However, the sub modules advantageously at least partially form a half-bridge circuit. In a half-bridge circuit, the power semiconductor circuit is made up of a series circuit made up of two power semiconductor switches which are able to be switched on and off, in which the series circuit is connected in parallel with the energy storage device. A first submodule connection terminal is connected to the potential point between the power semiconductor switches of the series circuit. The second submodule connection terminal is connected directly to one pole of the energy storage device.

Alternatively or additionally, it is possible to form the submodules completely or at least partially as a full-bridge circuit. In a full-bridge circuit, two series circuits are provided, each made up of two power semiconductor switches which are able to be switched on and off, in which both series circuits are connected in parallel with the energy storage device. A first submodule connection terminal is connected to the potential point between the power semiconductor switches, which are able to be switched on and off, of the first series circuit, and the second submodule connection terminal is connected to the potential point between the power semiconductor switches, which are able to be switched on and off, of the second series circuit.

Advantageously, each phase module branch has DC voltage terminals, wherein two surge arresters are provided, each extending between one of the DC voltage terminals and the converter neutral point. Within the scope of the present invention, the device has phase modules, the number of which corresponding to the number of phases of the connected AC voltage network. Each phase of the AC voltage network is connected to one of the AC voltage terminals via the converter transformer. In addition, two unequally polarized DC voltage terminals are provided which are at a positive DC voltage potential or a negative DC voltage potential with respect to the ground potential. For example, the voltage drop between the positive DC voltage terminal and the negative DC voltage terminal of the device is 600 kV. This total voltage, which is symmetrically distributed to the two DC voltage lines, is +300 kV or −300 kV with respect to the ground potential. Alternatively, one of the DC voltage terminals is at ground potential.

Advantageously, the converter transformer has primary windings which form a grounded neutral point, in which compensating windings are provided which are connected to each other in a delta configuration.

Additional advantageous embodiments and advantages of the present invention are the subject matter of the following description of exemplary embodiments of the present invention with reference to the FIGURE of the drawing, in which the FIGURE schematically illustrates one exemplary embodiment of the device according to the present invention.

BRIEF DESCRIPTION OF THE DRAWING

The FIGURE is a schematic view illustrating an exemplary embodiment of the device according to the present invention.

DESCRIPTION OF THE INVENTION

The FIGURE shows one exemplary embodiment of the device 1 according to the present invention. The device 1 has three phase modules 2, 3, and 4, each having a positive shared DC voltage terminal 5 and a negative shared DC voltage terminal 6. In addition, each of the phase modules 2, 3, and 4 is equipped with an AC voltage terminal 7. Phase module branches 8 extend between each of the shared DC voltage terminals 5 or 6 and each AC voltage terminal 7, each having a series circuit made up of two-pole submodules 9 and an inductor 10, which are connected to each other in series. The sequence of the submodules 9 and the inductor 10 is arbitrary. Each phase module 2, 3, and 4 therefore has two phase module branches 8 arranged in series. The series circuit made up of two-pole submodules 9 is only schematically depicted, in which it is indicated that the series circuit has IGBTs 11 as power semiconductor switches which are able to be switched on and off, in which a flyback diode 12 is inversely connected in parallel to each IGBT 11. However, expressed more precisely, the two-pole submodules 9 in the exemplary embodiment depicted in the FIGURE form a so-called half-bridge circuit, in which each submodule has an energy storage device and a series circuit which is connected in parallel to this energy storage device which is made up of two IGBTs 11, each having an inverse flyback diode 12. One of the submodule connection terminals is connected to the potential point between the two IGBTs 11. The other submodule connection terminal is connected directly to one of the poles of the energy storage device. Thus, depending on the control of the IGBTs 11, it is possible to generate either the voltage dropping across the energy storage device positively or negatively, or a zero voltage, between the submodule connection terminals in question.

From the FIGURE, it is furthermore apparent that the AC voltage terminals 7 of the phase modules, 2, 3, 4 are connected to phases 14 of an AC voltage network, which is otherwise not further depicted, via a converter transformer 13. The converter transformer 13 is equipped with primary windings 15 which are connected to each other at a grounded neutral point 16. The secondary windings 17 of the converter transformer 13 are connected to each other at a secondary-side converter neutral point 18 which, however, is not grounded. Compensating windings 19 are apparent between the primary windings 15 and the secondary windings 17, which are connected to each other in a delta configuration.

To protect the phase modules 8 which are connected to each other at a Graetz bridge, and thus the total device, from surges, two surge arresters 20 and 21 are provided, each extending between one of the shared DC voltage terminals 5 or 6 and the converter neutral point 18.

The present invention is based on the discovery that the maximum operating voltage between the AC voltage terminal 7 and, for example, the shared positive DC voltage terminal 5, may be on the order of the voltage dropping between the shared DC voltage terminals 5 and 6. Due to the response behavior of the surge arrester, this circuit variant is able to provide no effective protection via a surge arrester directly via the phase module branch 8. The AC voltage-side connection of the surge arresters 20 and 21 to the converter neutral point 18 has the advantage that the operating voltage dropping across each surge arrester 20, 21 is on the order of magnitude of half the maximum DC voltage which drops between the DC voltage terminals 5 and 6. Thus, in the case of internal converter faults, the surge arresters 20 and 21 are transferred from their high-resistance state to the low-resistance state before the protection device of the submodules of the phase modules 2, 3 and 4 engages.

The invention claimed is:

1. A device for transferring electrical power between an AC voltage network and a DC voltage network in a high-voltage range, the device comprising:

a plurality of phase modules each having two shared DC voltage terminals and each having a separate AC voltage terminal;

a respective phase module branch extending between each said DC voltage terminal and each said AC voltage terminal, said phase module branch including a series circuit with two-pole sub-modules each having two sub-module connection terminals;

each said two-pole sub-module having an energy storage device and a power semiconductor circuit connected in parallel with said energy storage device, and wherein, depending on a control of said power semiconductor circuit either the voltage dropping across said energy storage device or a zero voltage is generated at said two sub-module connection terminals;

a converter transformer having a primary side connected or connectable to an AC voltage network, said converter transformer having a secondary side connected or connectable to each said AC voltage terminal, and a converter neutral point on said secondary side; and two surge arresters respectively connected between one of said DC voltage terminals or a potential point having a comparable potential and said converter neutral point.

2. The device according to claim 1, wherein said submodules at least partially form a half-bridge circuit.

3. The device according to claim 1, wherein said submodules at least partially form a full-bridge circuit.

4. The device according to claim 1, wherein said converter transformer has primary windings connected at a grounded neutral point.

* * * * *